United States Patent
Bircher et al.

(10) Patent No.: US 12,043,356 B2
(45) Date of Patent: Jul. 23, 2024

(54) CONTROL SYSTEM FOR STEERABLE TOWED MARINE EQUIPMENT

(71) Applicant: DigiCOURSE, LLC, Harahan, LA (US)

(72) Inventors: Felix Ernest Bircher, Metairie, LA (US); Dale Lambert, Mandeville, LA (US); Nicholas Domingo Muguira, Hammond, LA (US); David A. Cespedes, Metairie, LA (US)

(73) Assignee: DigiCOURSE, LLC, Harahan, LA (US)

( * ) Notice: Subject to any disclaimer, the term of this patent is extended or adjusted under 35 U.S.C. 154(b) by 585 days.

(21) Appl. No.: 16/988,455

(22) Filed: Aug. 7, 2020

(65) Prior Publication Data

US 2022/0041259 A1 Feb. 10, 2022

(51) Int. Cl.
*G05D 1/00* (2024.01)
*B63B 79/40* (2020.01)

(52) U.S. Cl.
CPC ........... *B63B 79/40* (2020.01); *G05D 1/0206* (2013.01)

(58) Field of Classification Search
CPC ....... B63B 79/40; B63B 21/56; B63B 35/665; G05D 1/0206
See application file for complete search history.

(56) References Cited

U.S. PATENT DOCUMENTS

| | | | | |
|---|---|---|---|---|
| 3,747,056 A | * | 7/1973 | Treybig | G01V 1/28 367/59 |
| 4,404,664 A | * | 9/1983 | Zachariadis | G05D 1/0206 367/19 |
| 4,970,696 A | * | 11/1990 | Crews | G01V 1/003 367/15 |
| 6,273,771 B1 | * | 8/2001 | Buckley | G08G 3/02 114/144 RE |
| 6,418,378 B1 | * | 7/2002 | Nyland | G01V 1/3808 702/14 |
| 6,629,037 B1 | * | 9/2003 | Nyland | G01V 1/3808 702/14 |

(Continued)

FOREIGN PATENT DOCUMENTS

| | | | | |
|---|---|---|---|---|
| CA | 2742347 C | * | 5/2018 | ........... G01V 1/3808 |
| EP | 2402791 A2 | * | 1/2012 | ........... G01V 1/3808 |

(Continued)

OTHER PUBLICATIONS

"Method for steering a vessel with towed equipment;" Hélène Tonchia; OCEANS 2015—MTS/IEEE Washington (pp. 1-7); Oct. 1, 2015. (Year: 2015).*

(Continued)

*Primary Examiner* — Khoi H Tran
*Assistant Examiner* — Jorge O Peche
(74) *Attorney, Agent, or Firm* — Haynes and Boone, LLP (57) ABSTRACT

Embodiments herein describe techniques for controlling both a vessel and a separate controllable steering element so that a towed device moves along a predefined path or course. A steering system can include a first controller for steering the vessel and a second controller for controlling the steering element, which is in the water and also being towed by the vessel. In one embodiment, the steering system controls the vessel to ensure the steering element does not exceed a control limit.

17 Claims, 8 Drawing Sheets

(56) References Cited

U.S. PATENT DOCUMENTS

| | | | | |
|---|---|---|---|---|
| 7,104,857 B1* | 9/2006 | Swan | B63H 25/14 | 440/61 S |
| 7,112,107 B1* | 9/2006 | Torgerud | B63H 21/213 | 440/2 |
| 7,305,928 B2* | 12/2007 | Bradley | B63H 25/42 | 114/144 R |
| 7,415,936 B2 | 8/2008 | Storteig et al. | | |
| 7,422,497 B1* | 9/2008 | Wyant | B63H 21/213 | 440/2 |
| 7,941,253 B1* | 5/2011 | Brant | B63H 21/213 | 701/21 |
| 7,957,220 B2 | 6/2011 | Howlid et al. | | |
| 7,997,222 B2* | 8/2011 | Hiroshima | B63H 21/213 | 114/144 RE |
| 8,113,892 B1* | 2/2012 | Gable | B63H 21/21 | 114/144 RE |
| 8,391,102 B2 | 3/2013 | Holo | | |
| 8,483,008 B2 | 7/2013 | Welker | | |
| 8,570,830 B2 | 10/2013 | Storteig et al. | | |
| 8,760,964 B2 | 6/2014 | Moldoveanu et al. | | |
| 8,824,239 B2* | 9/2014 | Welker | G01V 1/3835 | 367/16 |
| 9,132,903 B1* | 9/2015 | Gable | B63J 99/00 | |
| 9,493,222 B1* | 11/2016 | Chapman | B63H 20/06 | |
| 9,568,630 B2 | 2/2017 | Tonchia et al. | | |
| 9,632,195 B2 | 4/2017 | Martin | | |
| 9,690,295 B1* | 6/2017 | Abellera | G06F 17/00 | |
| 9,791,582 B2 | 10/2017 | Martin | | |
| 9,809,292 B1* | 11/2017 | Gonring | G05D 1/0206 | |
| 9,904,293 B1* | 2/2018 | Heap | G05D 1/12 | |
| 10,185,047 B2 | 1/2019 | Tonchia | | |
| 10,196,122 B1* | 2/2019 | Andrasko | B63H 25/02 | |
| 10,254,422 B2 | 4/2019 | Martin | | |
| 10,488,541 B2 | 11/2019 | Schneider | | |
| 10,507,893 B2 | 12/2019 | Martin | | |
| 10,520,624 B2 | 12/2019 | Moulinier et al. | | |
| 10,703,456 B1* | 7/2020 | Andrasko | B63H 25/02 | |
| 11,535,348 B2* | 12/2022 | Hashizume | B63H 21/22 | |
| 11,940,796 B2* | 3/2024 | Lambert | B63B 21/66 | |
| 2003/0208320 A1* | 11/2003 | Zajac | G01V 1/3826 | 702/14 |
| 2004/0035345 A1* | 2/2004 | Lundgren | B63H 9/069 | 114/102.18 |
| 2006/0240720 A1* | 10/2006 | Yamashita | B63H 20/12 | 440/86 |
| 2006/0256654 A1* | 11/2006 | Paulsen | G01V 1/38 | 367/20 |
| 2007/0064526 A1 | 3/2007 | Holo | | |
| 2009/0141587 A1* | 6/2009 | Welker | G01V 1/3835 | 367/16 |
| 2009/0301374 A1* | 12/2009 | Davis | B63H 25/02 | 114/144 R |
| 2009/0310439 A1* | 12/2009 | Hauan | G01V 1/3835 | 367/20 |
| 2010/0118645 A1* | 5/2010 | Welker | B63B 21/66 | 367/19 |
| 2010/0151750 A1* | 6/2010 | Ito | B63H 20/10 | 440/1 |
| 2010/0182871 A1* | 7/2010 | Toennessen | G01V 1/3826 | 367/17 |
| 2011/0286301 A1* | 11/2011 | Seale | G01V 1/3817 | 367/16 |
| 2011/0286302 A1* | 11/2011 | Welker | G01V 1/3826 | 367/16 |
| 2012/0002502 A1* | 1/2012 | Hillesund | G01V 1/3808 | 367/20 |
| 2012/0232727 A1* | 9/2012 | Iwata | B63H 21/21 | 701/21 |
| 2012/0281498 A1* | 11/2012 | Seale | G01V 1/3826 | 367/19 |
| 2013/0155805 A1* | 6/2013 | Tonchia | G01V 1/3817 | 367/16 |
| 2015/0016218 A1* | 1/2015 | Welker | G01V 1/3817 | 367/16 |
| 2015/0217837 A1* | 8/2015 | Szydlowski | B63B 25/12 | 114/74 R |
| 2015/0236668 A1* | 8/2015 | Poole | G06F 17/142 | 703/2 |
| 2015/0253446 A1* | 9/2015 | Hauan | G01V 1/30 | 702/14 |
| 2019/0344869 A1* | 11/2019 | Chan | B63H 20/12 | |
| 2019/0377348 A1* | 12/2019 | Lambert | B63B 21/66 | |
| 2020/0108898 A1* | 4/2020 | Martin | G01V 1/3826 | |
| 2020/0256967 A1* | 8/2020 | Wigh | G01S 7/6218 | |
| 2021/0221476 A1* | 7/2021 | Szydlowski | B63B 35/285 | |
| 2021/0403131 A1* | 12/2021 | Kato | B63B 34/10 | |
| 2022/0041259 A1* | 2/2022 | Bircher | G05D 1/0206 | |
| 2024/0025528 A1* | 1/2024 | Derginer | B63H 25/02 | |

FOREIGN PATENT DOCUMENTS

| | | | | |
|---|---|---|---|---|
| EP | 3805088 A1 * | 4/2021 | | B63B 39/061 |
| EP | 3671286 B1 * | 4/2022 | | B63B 21/16 |
| EP | 4309997 A1 * | 1/2024 | | B63H 21/213 |
| GB | 2429541 A * | 2/2007 | | G01V 1/3826 |
| JP | 2010132127 A * | 6/2010 | | B63H 25/02 |
| WO | WO-2021229509 A1 * | 11/2021 | | |

OTHER PUBLICATIONS

"Marine Geophysical Exploration: The State of the Art;" Sheriff et al., IEEE Transactions on Geoscience Electronics (vol. 15, Issue: 2, pp. 67-73); Apr. 1, 1977. (Year: 1977).*

"SAIC marine unexploded ordnance (UXO) survey system;" Bassani et al. OCEANS 2008 (pp. 1-10); Sep. 1, 2008. (Year: 2008).*

PCT, Notification of Transmittal of the International Search Report and The Written Opinion of The International Searching Authority, or the Declaration for Application PCT/US2021/039297 dated Oct. 29, 2021.

* cited by examiner

CONTROL SYSTEM FOR STEERABLE TOWED MARINE EQUIPMENT

TECHNICAL FIELD

The technology described herein relates to control systems and methods for controlling steering systems for towed marine equipment.

BACKGROUND

Seismic arrays with sources and streamers are used to study rock strata and other structures below the surface. One or more marine vessels are typically used to tow source and/or receiver arrays to obtain relevant geological data covering a desired surface area of the ocean floor. For example, a single surface vessel may simultaneously tow both a source array and an array of seismic streamers, or different vessels can be used to tow separate source and receiver arrays. Alternatively, a towed source array can be used in conjunction with stationary receivers, for example, an array of ocean-bottom nodes, or with ocean-bottom cables deployed on the seabed.

During operation, acoustic shock waves generated by the source array propagate through the water to penetrate the ocean floor and are reflected from subsurface structures. The reflected acoustic waves are recorded as signals or seismic responses by the receivers, e.g., hydrophones and/or geophones towed behind a vessel or deployed on the ocean floor. It can be important that the towed marine equipment such as cables with seismic sensors and other equipment closely follow a predetermined path or course in order to accurately map a subsurface formation. For example, a 4D seismic survey tracks how subsurface structures change over time (e.g., as an oil or gas reserve is depleted) which requires the towed marine equipment to follow the same path each time the vessel traverses the survey area. In addition, if multiple cables are deployed behind a marine vessel it may be important to maintain a constant separation distance between the cables to ensure accuracy in the sensor readings and reduce the need for error correction.

Lateral forces are applied to maintain position and spacing of the seismic sources and other array elements as they are towed behind the vessel. The spacing depends on the number of sources and/or streamer cables that are deployed, and on the spacing between adjacent source and/or receiver components. Typically, a number of source sub-arrays or strings are deployed behind the vessel using a tow rope configuration to spread the sources over lateral distances of approximately ten to one hundred meters or more. Streamer cables are typically deployed over much larger lateral distances, for example, from one hundred meters to a kilometer or more, and may extend for several kilometers behind the tow vessel.

Lateral spacing can be achieved by deploying a paravane or diverter apparatus on a dedicated tow rope arrangement using a spreader or series of individual tether lines to provide the desired spacing between adjacent cables. Positioning devices can also be provided along each streamer cable, in order to maintain depth and/or lateral offset along the cable length. In other implementations, a dynamically controlled, steerable foil system may be used for steering and positioning such towed equipment in a marine seismic array.

The information included in this Background section of the specification, including any references cited herein and any description or discussion thereof, is included for technical reference purposes only and is not to be regarded subject matter by which the scope of the invention as defined in the claims is to be bound.

SUMMARY

One embodiment of this disclosure is a method that includes identifying an error between a location of a towed device being towed by a vessel and a desired path, determining a course correction for the vessel to reduce the error and maintain a steering element within a control limit where the steering element controls the location of the towed device and is being towed by the vessel, determining an adjustment for the steering element to reduce the error where the adjustment is within the control limit, and controlling the vessel using the course correction and the steering element using the adjustment.

Another embodiment of this disclosure is a non-transitory computer-readable storage medium storing instructions, which when executed on a processor, perform an operation. The operation includes identifying an error between a location of a towed device being towed by a vessel and a desired path, determining a course correction for the vessel to reduce the error and maintain a steering element within a control limit where the steering element controls the location of the towed device and is being towed by the vessel, determining an adjustment for the steering element to reduce the error where the adjustment is within the control limit, and controlling the vessel using the course correction and the steering element using the adjustment.

Another embodiment of this disclosure is a system that includes a processor and memory configured to store a program which, when executed by the processor performs an operation. The operation includes identifying an error between a location of a towed device being towed by a vessel and a desired path, determining a course correction for the vessel to reduce the error and maintain a steering element within a control limit where the steering element controls the location of the towed device and is being towed by the vessel, determining an adjustment for the steering element to reduce the error where the adjustment is within the control limit, and controlling the vessel using the course correction and the steering element using the adjustment.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

DETAILED DESCRIPTION

In the following disclosure, reference is made to a number of exemplary embodiments or specific implementations of the claimed invention. However, it should be understood that the claims are not limited to specific described embodiments. Instead, any combination of the following features and elements, whether related to different embodiments or not, is contemplated to implement and practice the claimed invention.

Furthermore, the various embodiments may provide numerous advantages over the prior art. However, although such embodiments may achieve advantages over other possible solutions and over the prior art, whether or not a particular advantage is achieved by a given embodiment is not limiting of the claims. Thus, the following aspects, features, embodiments, and advantages are merely illustrative and are not considered elements or limitations of the appended claims except where explicitly recited in the claims. Likewise, reference to "the invention" shall not be construed as a generalization of any inventive subject matter disclosed herein, and shall not be considered to be an element or limitation of the appended claims except where explicitly recited in the claims.

Embodiments herein describe techniques for controlling both a vessel and a separate, controllable steering element so that a towed device moves along a predefined path or course. For example, a steering system can include a first controller for steering the vessel and a second controller for controlling the steering element, which is in the water and also being towed by the vessel. These two controllers work together to move the towed device along the desired path. As such, the steering system can provide automated or autonomous control so that human intervention is not required in order to move the towed device (e.g., a seismic sensor or transmitter) along the desired path in the water.

In one embodiment, the steering system controls the vessel to ensure the steering element does not exceed a control limit. That is, the ability of the steering element to change the course of the towed device may be limited by a physical control limit (e.g., maximum and minimum control settings) or a practical control limit (e.g., maximum and minimum control settings where the steering element becomes uncontrollable). Put differently, the steering system can set the course of the vessel to ensure the steering element does not have to exceed the control limit in order to move the towed device along the desired path. In one embodiment, the steering system sets the course of the vessel so that the steering element can be controlled at an optimized value. For example, the steering system may set the course of the vessel such that the control setting of the steering element is set at the middle of its operable range, or so that the control setting is set to a setting that has the least amount of drag or provides the best maneuverability to the towing system as a whole.

Figure 1:
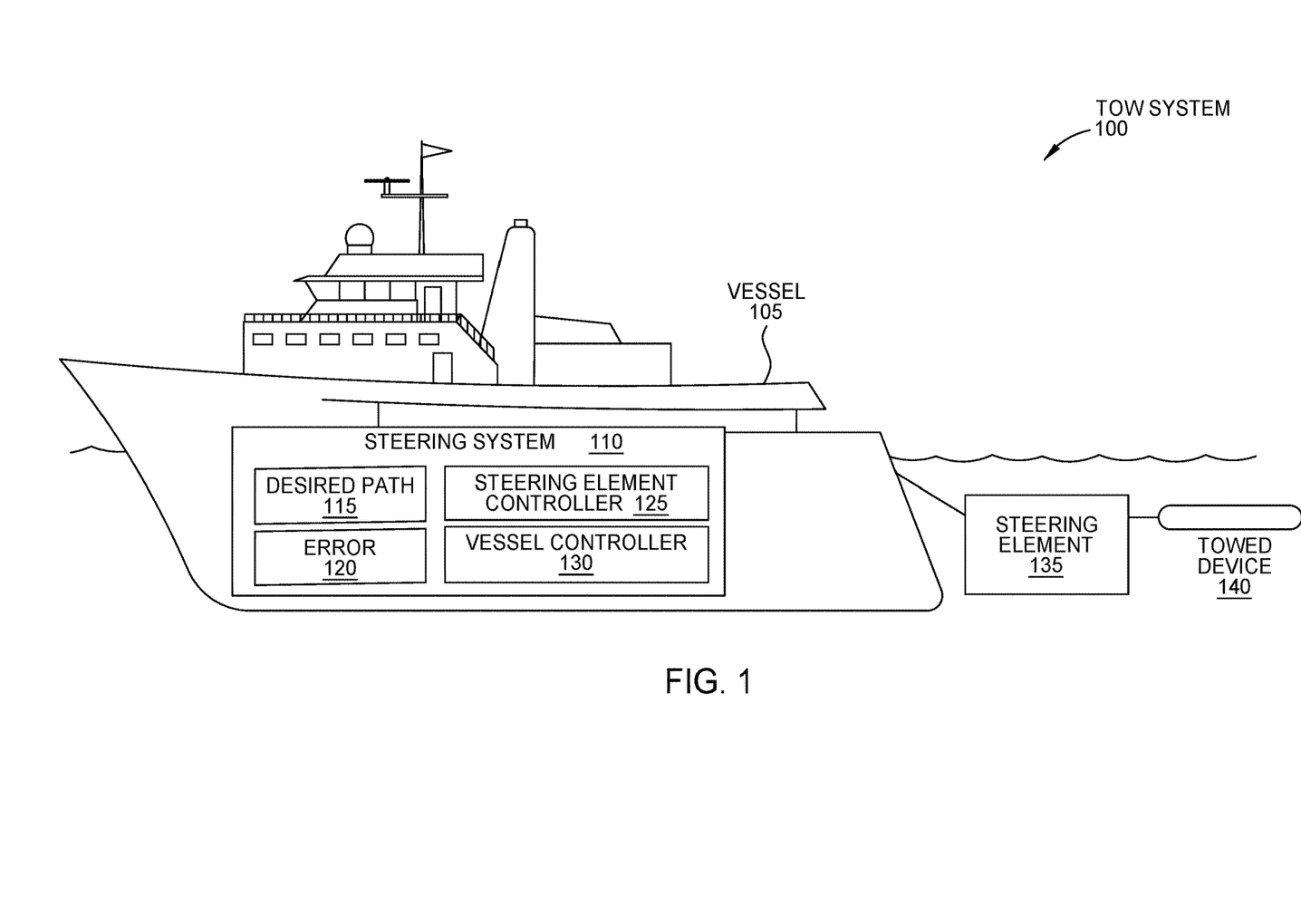
FIG. 1 illustrates a steering system for controlling a vessel and an in-water steering element, according to one embodiment herein.

FIG. 1 illustrates a tow system 100 that includes a steering system 110 for controlling a vessel 105 and an in-water steering element 135, according to one embodiment herein. The tow system 100 includes the vessel 105 which tows the steering element 135 and the towed device 140. That is, both the steering element 135 and the towed device 140 are towed in the water by the vessel 105. The steering element 135 and the towed device 140 can be connected to the vessel 105 using any number of tow lines such as cables, ropes, or wires.

In general, the steering element 135 applies a force (e.g., a lateral force relative to the direction the vessel 105 is moving) to change the position of the towed device 140 (e.g., to change its lateral position). While FIG. 1 illustrates that the steering element 135 is coupled between the vessel 105 and the towed device 140, in other embodiments the towed device 140 is coupled between the vessel 105 and the steering element 135. In yet another embodiment, the steering element 135 is coupled to the vessel 105 with a first cable, the towed device 140 is coupled to the vessel 105 using a second cable, and a third cable couples the steering element 135 to the towed device 140. The embodiments herein are not dependent on any particular technique for towing the steering element 135 and the towed device 140 so long as that the steering element 135, along with the vessel 105, can change the position of the towed device 140 in the water.

In one embodiment, the steering element 135 and the towed device 140 are used to perform seismic exploration to identify geologic features below a bottom floor of the body of water. For example, the towed device 140 may be a seismic source for generating seismic energy, or a seismic receiver for receiving reflected seismic energy. However, the embodiments herein are not limited to seismic exploration (e.g., carbon exploration) and can be used in any tow system where an in-water steering element 135 is used to control a position of a towed device 140.

The steering element 135 is shown generically in FIG. 1 but specific non-limiting examples can be a paravane, hydrofoil, rudder, wing, elevator, and various other controllable device. The steering element 135 has at least one control setting that controls a mechanical actuator in the steering element 135 that creates a force for altering the position of the towed device 140. For example, the control setting may set a pitch or angle of attack of the steering element 135 which creates lift in the body of water that creates a lateral force that moves the towed device 140. As described in more detail below, this control setting also has a physical or practical control limit which limits the amount of force the steering element 135 can apply on the towed device 140.

The vessel 105 includes the steering system 110 which may be formed using one or more computing systems that includes one or more processors and memory. Further, while the steering system 110 is disposed on the vessel 105 in FIG. 1, in other embodiments, at least a portion of the steering system 110 may be disposed in a cloud computing environment that is communicatively coupled to other portions of the steering system 110 on the vessel 105.

In this example, the steering system 110 includes a desired path 115, a course or path error 120, a steering element controller 125, and a vessel controller 130. In general, the steering system 110 receives or determines location information regarding the towed device 140 (e.g., the currently location of the device 140) and then compares this location to the desired path 115 of the towed device 140 to generate the error 120. Put differently, the steering system 110 can determine the error 120 between the desired path 115 of the towed device 140 and its current location. The steering system 110 can then issue instructions to the steering element controller 125 and the vessel controller 130 to change a control setting of the steering element or the course of the vessel (or both) so that the towed device 140 moves along the desired path 115. In one embodiment, the steering system 110 is a feedback system where the location of the towed device 140 is constantly (or intermittently) measured so that any error 120 can be corrected using the steering element controller 125 and the vessel controller 130.

In one embodiment, the steering system 110 generates course corrections to the vessel controller 130 so that any adjustments to the steering element 135 are within its control limit. That is, when providing instructions to the steering element controller 125 and the vessel controller 130, these instructions are derived so that vessel controller 130 controls the course of the vessel 105 so that any adjustments also performed by the steering element 135 to maintain the towed device 140 in its desired path 115 are within the control limit of the steering element 135. If, for example, the error 120 would require the control setting of the steering element 135 to move beyond the control limit in order to move the towed device 140 onto the desired path 115, instead of solely using the steering element 135, the steering system 110 uses the vessel controller 130 (either alone or in tandem with the steering element controller 125) to mitigate the error and move the towed device 140 onto the desired path 115. If the steering system 110 included only the steering element controller 125, the movement of the towed device 140 onto the desired path would be limited by the control limit of the steering element 135. That is, if the vessel 105 strayed too far from the desired path 115 such that the steering element 135 was unable to operate within its control limits to keep the towed device 140 on the desired path 115, then the steering system 110 would be unable to maintain the device 140 on the path 115, thereby reducing the accuracy of any seismic survey that relies on the vessel 105 following a predefined path.

Figure 2:
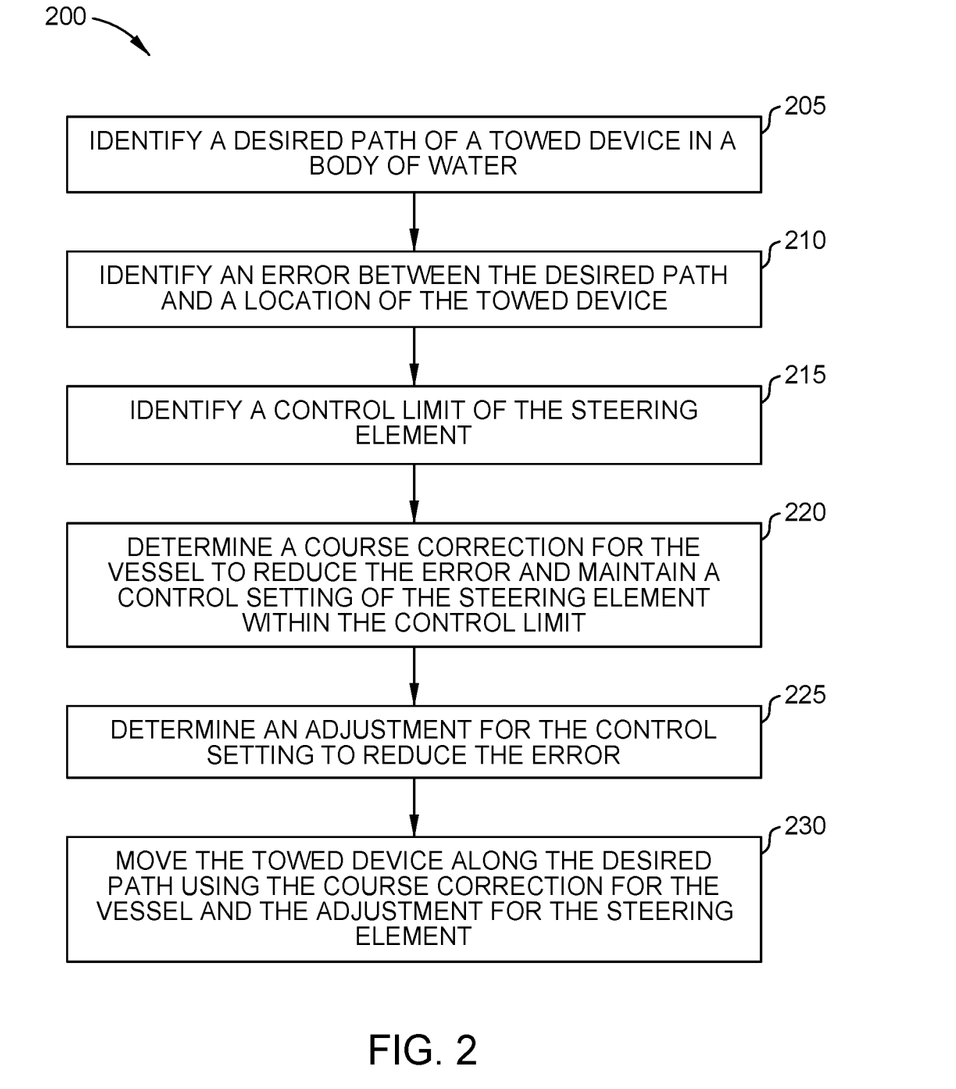
FIG. 2 is flowchart for controlling a vessel to maintain the steering element within a control limit, according to one embodiment herein.

FIG. 2 is a flowchart of a method 200 for controlling a vessel to maintain the steering equipment within a control limit, according to one embodiment herein. At block 205, the steering system identifies a desired path of a towed device in a body of water. For example, a 4D seismic survey tracks how subsurface structures change over time (e.g., as an oil or gas reserve is depleted) which requires the towed marine equipment to follow the same path each time the vessel traverses the survey area. In addition, if multiple cables (coupled to multiple towed devices) are deployed behind a marine vessel it may be important to maintain a constant separation distance between the cables to ensure accuracy in the sensor readings and reduce the need for error correction. The accuracy of these exemplary survey techniques rely on the ability of the steering system to keep one or more towed devices on a desired path (or paths).

At block 210, the steering system identifies an error between the desired path and a location of the towed device. For example, the steering system may use GPS signals or other location information to track the current location of the towed device in the water. The steering system can then identify an error (if any) between the current location of the towed device and the desired path.

At block 215, the steering system identifies a control limit of the steering element. In one embodiment, the control limit is a physical limit (or range) of a control setting of the in-water steering element. For example, the steering element may be able to rotate only −/+45 degrees from an initial setting to generate a lateral force on the towed device—e.g., to move the towed device to port or starboard. In this example, the mechanical actuator or actuators on the steering system are unable to rotate the steering system beyond this range.

In another embodiment, the steering element is limited by a practical limit (or range). For example, while the steering element may be physically capable of rotating+/−45 degrees, the steering element may lose lift in the water if it is rotated more than 35 degrees in either direction. If the steering system sets the rotational control setting 35 above degrees, the steering element may cease applying a force to the towed device, or may apply an unpredictable or undesired force to the towed device. In one embodiment, if the practical limit of the steering element is exceeded, the steering element becomes uncontrollable, which may cause the towed device to move further off the desired path.

In addition to causing the towed device to move off the desired path, exceeding the practical limit of the steering element may result in damage to the towed device. For example, the vessel may tow several steering elements that control the spacing between several towed devices. If the steering elements exceed their practical limits, they may lose lift which causes the towed devices to collapse along a single path behind the vessel. The tow lines towing the towed devices may become tangled and the devices may strike each other which, at a minimum, may slow down the survey while the cables are untangled but may also damage the towed devices. As such, the method 200 can coordinate the actions of the steering element controller and the vessel controller so that the control limit of the steering element is not met or exceeded, and the towed device stays on the desired path.

At block 220, the steering system determines a course correction for the vessel to reduce the error and maintain a control setting of the steering element within the control limit. For example, the steering system may determine that if it were to rely solely on the steering element to mitigate the error, it would require a control setting that exceeds the control limit of the steering element. Put differently, the steering system may determine that the steering element is incapable of keeping the towed device on the desired path without a course correction from the vessel. In response, the steering system can generate a course correction for the vessel that can be used to keep or move the towed device on the desired path while the steering element operates within its control limit (either physical or practical).

In another embodiment, rather than waiting until the steering element is unable to keep the towed device on the desired path without making a course correction using the vessel controller, the steering system may set the vessel controller to keep a control setting of the steering element (e.g., a rotational angle, pitch, pulley setting, etc.) at an optimized value. This optimized value may be set based on different optimization goals such as ensuring the steering element can react to unexpected currents in the water, reduce drag, enable quicker turning of the tow system, improve fuel efficiency and the like. These control strategies are discussed in more detail in FIG. 3. In any case, the steering system can use the vessel controller in tandem with the steering element controller to keep the towed device on the desired path and reduce the likelihood that the combined steering system encounters a scenario where the vessel and the steering element are unable to keep the towed device on the desired path.

In one embodiment, block 220 is omitted if a desired course correction can be achieved by the steering element alone. That is, before performing block 220, the steering system may determine whether the steering element is sufficient to provide the course correction. In that case, the steering system may not issue a course correction for the vessel.

At block 225, the steering system determines an adjustment for the control setting to reduce the error. That is, in addition to using the vessel to reduce the error, the steering system provides an instruction to the steering element control to adjust the control setting of the steering element for keeping or moving the towed device onto the desired path. Due to the tow distance between the vessel and the tow device, the course correction performed by the tow vessel may not be able to accurately keep the towed device on the desired path. For example, currents may make it difficult for the vessel, on its own, to keep the towed device on the desired path. Whatever error that remains can be mitigated by the steering element. The steering element may be able to make quicker changes to the location of the towed device than the vessel. Further, adjusting the control setting of the steering element may result in more reliable or predictable location adjustments for the towed device.

At block 230, the vessel and steering element move the towed device along the desired path using the course correction and the adjustment determined at blocks 220 and 225. For example, the steering system can provide the course correction and adjustment to the vessel controller and steering element controller respectively. These controllers can then work together to keep or move the towed device onto the desired path.

Figure 3:
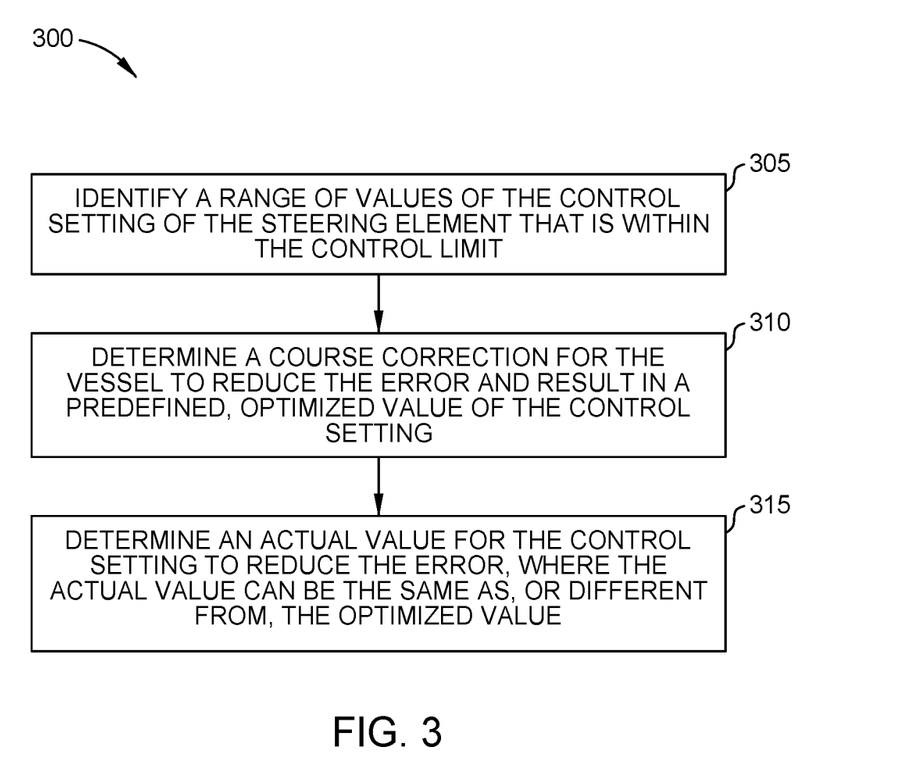
FIG. 3 is a flowchart for controlling a vessel to maintain a control setting of the steering element at an optimized value, according to one embodiment herein.

FIG. 3 is a flowchart of a method 300 for controlling a vessel to maintain a control setting of the steering equipment at an optimized value, according to one embodiment herein. The method 300 describes techniques for setting course corrections for the vessel that not only ensure the steering element operates within the control limit as discussed in the method 200 but also proactively sets the steering element at an optimal control setting value.

At block 305, the steering system identifies a range of values of the control setting of the steering element that is within the control limit. These range of values may be based on physical control limits that are the limits of the actuator or actuators in the steering element that are controlled by the control setting. Alternatively, the range of values may be based on the practical control limits. In either case, the range of values represent the possible values available to the steering system for controlling the steering element.

At block 310, the steering system determines a course correction for the vessel that reduces the error between the desired path and the current location of the towed device and results in a predefined optimized value of the control setting. That is, as part of ensuring the steering element does not need to be set with a control setting that exceeds its limit to keep the towed device on the desired path, the steering system can identify the course correction for the vessel that results in the control setting of the steering element having an optimized value.

For example, the steering system may steer the vessel so that the control setting of the steering element is set to an initial or default setting. For example, if the control setting sets a pitch or angular rotation of the steering element, the optimized value may be the neutral pitch or zero rotation value. Doing so provides the steering element with greater flexibility for adjusting if an unexpected current occurs. For example, the survey may take place near a mouth of a river that, at certain sections, introduces a strong cross current. Setting the course of the vessel to enable the control setting of the steering element to be as close as possible to the initial or default value gives the steering system the ability to change the control setting rapidly if an unexpected lateral current does occur. That is, the steering system may not be able to change the course of the vessel quickly enough to compensate for a strong lateral cross current that moves the towed device from its desired path. But because the steering element is maintained at its initial value, when a strong cross current does appear, the steering system has sufficient flexibility in the range of the control setting to ensure the steering element can ensure the towed device stays on the desired path.

In other embodiments, the optimized value may not be the initial or default value. For example, as in the case of cross currents caused by a river, the steering system may know the direction from which strong cross currents are likely to originate. In that case, the steering system may set the course of the vessel so that the control setting of the steering element is set to, e.g., 30% of its positive rotation in anticipation that a reduced or negative rotation will be needed to compensate for the cross current. Thus, if a strong cross current from the river suddenly hits the towed device, the steering system may have more range available in the control setting to compensate for the cross current relative to maintaining the control setting at its initial value. For example, reducing the positive rotation of the steering element may create a force on the towed device that opposes the cross current, in which case, the steering system can reduce the rotation from 30% to the initial or default value (i.e., no rotation)), as well as from the initial or default value to the control setting's maximum negative control limit (i.e., 100% negative rotation). In this manner, the optimized value can be set to provide greater flexibility to the steering system to handle unexpected cross currents.

In another embodiment, the optimized value of the control setting is set to reduce drag on the vessel, improve fuel efficiency, or improve the turning radius or time of the tow system. Further, these optimized values may depend on the speed at which the vessel is traveling or the number of towed devices (or tow lines) being employed by the tow system. In those cases, the steering system may use the current arrangement and configuration of the tow system to identify the optimized value of the control setting of the steering element and then select a course of the vessel that results in the optimized value being used to control the steering element. Stated differently, the steering system can control the course of the vessel so that the steering element uses the optimized value to maintain or move the towed device onto the desired path.

In another embodiment, the optimized value of the control setting is set to minimize the number (or size) of the course corrections for the vessel. That is, the steering system may attempt to steer the vessel as straight as possible. In that case, the optimized value for the steering system is whatever value ensures the towed device remains on the desired path and is within the control limit. Only if the steering element is unable to keep the towed device on the desired path and stay within its control limit does the steering system issue a course correction to the vessel controller.

At block 315, the steering system determines an actual value for the control setting to reduce the error, where the actual value can be the same as, or different from, the optimized value. As mentioned above, changing the course of the vessel to keep the towed device on the desired path may be slow, or may not control the path of the towed device with sufficient accuracy. Thus, while the steering system can select the course of the vessel to both keep the towed device on the desired path and operate the steering element at the optimized control setting value, this may not be possible due to cross currents, slow reaction time, etc. In one embodiment, the steering system sets the value of the control setting of the steering element at the value required to keep (or move) the towed device on the desired path, even if that means the value is different from the optimized value. This represents a tradeoff between the optimized parameter (e.g., flexibility, drag, fuel efficiency, etc.) with the accuracy of the survey.

However, in other embodiments, the optimized parameter may be more important than keeping the towed device on the desired path. In that scenario, the steering system may keep the steering element at the optimized value even if that results in the towed device drifting from the desired path. The steering system may attempt to move the towed device back onto the desired path using only course corrections to the vessel while continuing to operate the steering element at the optimized value. However, if the towed device begins to drift too far from the path (e.g., with more than a 5% error) even after trying to correct the course setting of the vessel, the steering system may change the control setting from the optimized value to a value that moves the towed device closer to the desired path.

Figure 4:
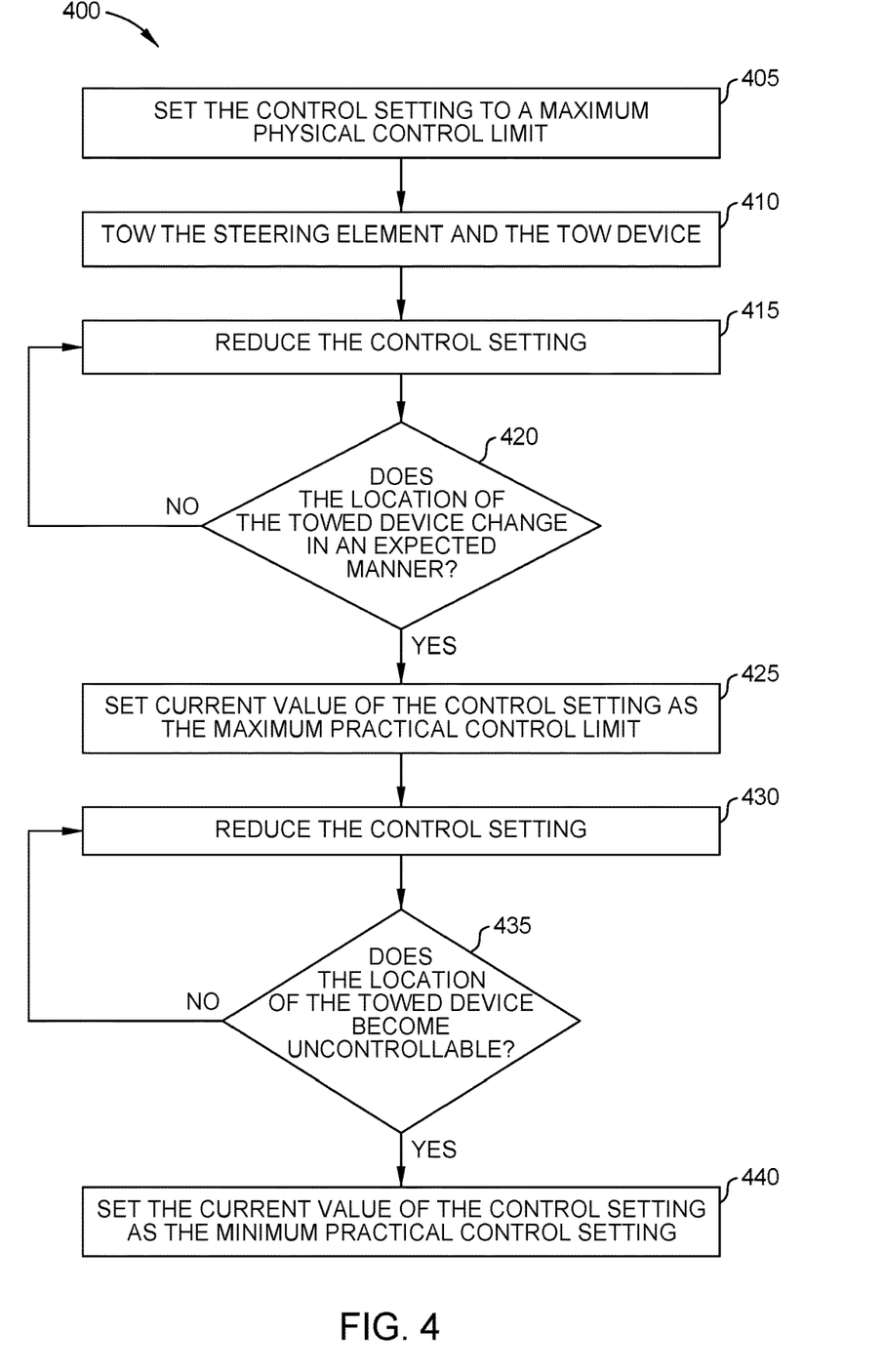
FIG. 4 is a flowchart for identifying a practical control range of the steering element, according to one embodiment herein.

FIG. 4 is a flowchart of a method 400 for identifying a practical control range of the steering equipment, according to one embodiment herein. As mentioned above in the methods 200 and 300, the steering system can use the vessel controller to ensure a control setting of the steering element does not have to exceed a control limit in order to keep or move a towed device on its desired path. The method 400 provides a technique for identifying a practical limit of the steering element. In one embodiment, the practical limit defines a range of values of the control setting that is a subset of the range of values within the physical limits of the control setting. For example, a mechanical actuator may be capable of rotating the steering element between −45 degrees to +45 degrees which is the physical control range. However, the steering element may be controllable only within the range of −35 degrees to +35 degrees, which is the practical control range. The method 400 provides a technique for identifying the practical control range (also referred to as the power band) of the steering element for a given tow scenario.

At block 405, the steering system sets the control setting of the steering element to a maximum physical control limit. Using the previous example, the steering system may initial set the rotation angle of the steering element to +45 (or −45) degrees.

At block 410, the vessel begins to tow the steering element and the tow device using the same configuration and settings that will be used when performing the seismic survey. The practical limits of the steering element may be effected by the depth of the steering element, the speed of the vessel, the number of towed devices (e.g., the load on the steering element), the tension of the tow line, the number of other steering elements being towed, and the like. Thus, when performing the method 400, the tow system may try to replicate the same arrangement and settings that are used during the seismic survey. For example, the method 400 may be performed before the tow system enters a survey area to begin a seismic survey.

At block 415, the steering system reduces the control setting by a predefined amount (e.g., reduces the rotation angle of the steering element from +45 degrees to +44 degrees). At block 420, the steering system determines whether the location of the steering element changes in an expected manner due to reducing the control setting. As mentioned above, the physical control limit of the control setting may be outside the practical limit or range, and as a result, the steering element may be uncontrollable when the control setting is at the maximum physical control limit. For example, the steering element may not generate lift. Thus, changing the control setting may not have any effect on the location of the towed device, or might not have a predictable effect on the towed device.

The blocks 415 and 420 repeat where the steering system continues to reduce the control setting until eventually the location of the towed device changes in an expected manner. In one embodiment, the steering system sweeps the control setting from a first end of the physical control range (e.g., +45 degrees) to a second end of the physical control range (e.g., −45 degrees) at predefined intervals. That is, the steering system sweeps the control setting until the steering element becomes controllable and has an expected or predictable effect on the towed device (e.g., the steering elements achieves lift in the water).

At block 425, the steering system sets the current value of the control setting as the maximum practical control limit of the steering element. As mentioned above, this value may be specific to the current arrangement and properties of the tow system.

At block 430, the steering system continues to reduce the control setting, and at block 435, determines whether the location of the towed device become uncontrollable. That is, the method 400 repeats block 430 and 435 to sweep the control setting until changes to the control setting no longer cause an expected (or predictable) change to the location of the towed device. That is, the steering element may again lose lift which means changes to the control setting no longer predictably control the location of the towed device.

At block 440, the steering system sets the current value of the control setting as the minimum practical control setting. The maximum and minimum practical control setting are practical control limits to define the practical control range or power band of the steering element for the particular tow system being tested. While the maximum and minimum practical control settings may be different than the maximum and minimum physical control settings, they may also be the same. For example, the steering element may never become uncontrollable for one tow system, but does in another tow system due to a difference in tow speed, tension on the tow rope, number of towed devices, number of other steering elements, and the like.

In this manner, the method 400 can be used to identify the practical control limits for a steering element for a given tow system. Once identified, the steering system can use the vessel control to ensure the steering element is not asked to exceed these practical limits to keep the towed device on its desired path as discussed in methods 200 and 300, since doing so may result in the steering element becoming uncontrollable.

If environmental conditions or the tow configuration changes, the tow system can re-execute the method 400 to again identify the practical control limits.

In one embodiment, rather than testing the tow system to identify the practical limits using method 400, the steering system may choose a conservative range of values to use as the practical control limits. For example, if historical tests indicate the practical range is typically 90-95% of the physical control range for similarly configured tow systems, rather than testing to find the actual practical control range, the steering system may simply assign the practical range as 85% of the physical control range, which is safely below the practical limits identified from historical tests.

Figure 5A:
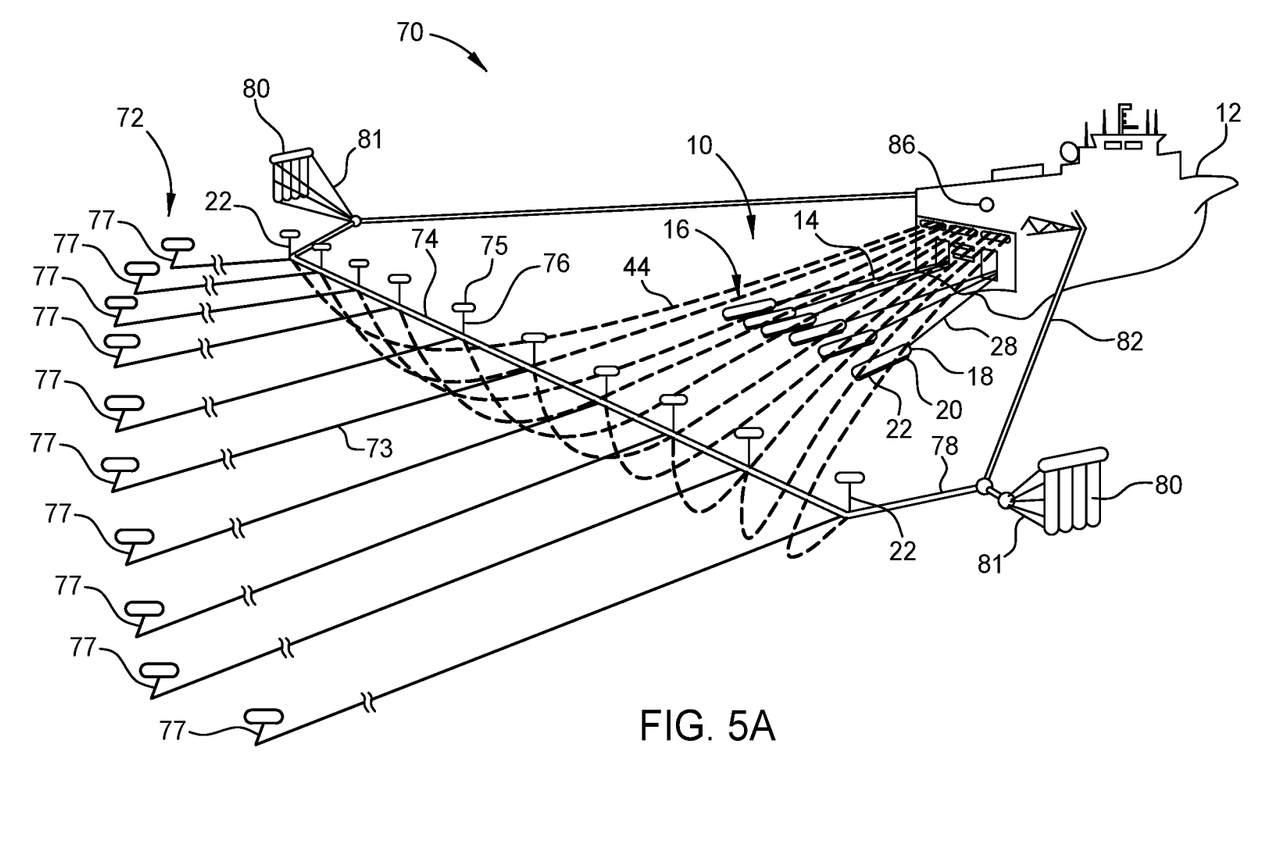
FIG. 5A is a schematic view of a representative towed seismic array utilizing one or more dynamically controlled foil systems for steering source and/or streamer component.

FIG. 5A is a schematic illustration of a representative towed seismic array 70 utilizing one or more dynamically controlled foil systems 20 for steering source and/or streamer components. The seismic array 70 includes a source array 10 and a streamer array 72 towed by a seismic survey craft or other vessel 12. Tow lines or cables 14 are coupled to the vessel 12 at one end and attached to a sub-array or string 16 of seismic sources at the other. For example, each tow cable 14 can be coupled to a series of air guns or other sources suspended from a head float, buoy, or other flotation apparatus 18.

The source array 10 is directed along a navigational course or sail line by the tow vessel 12. Within the source array 10, the relative positions of the individual sources (or sets of sources) can be controlled by providing a dynamically steerable foil system for each floatation apparatus 18, or for groupings of floatation apparatus 18, as described above.

The source array 10 includes a number of head/sausage type floats 18 from which individual seismic sources 22 are suspended with umbilical cables 28 for power, data, and pneumatic connections to the survey vessel 12.

The streamer array 72 includes a plurality of individual streamer cables 73 with seismic receivers distributed along each cable length to observe the reflected signals from the seismic sources 22. The streamer cables 73 are coupled to tow lines or other submerged cables 44 along a spreader or separation rope 74, which is suspended at a streamer depth below corresponding head buoys 75 using tag lines or depth ropes 76. The streamers 73 may extend many kilometers from the head buoys 75 toward a corresponding number of tail buoys 77 at the aft end. (Thus, FIG. 5A is not to scale).

As shown in FIG. 5A, the separation rope 74 is laterally extended by attachment to spur lines 78, which are coupled to paravanes or diverters 80 via deflector straps 81.

Wide tow ropes 82 run between paravanes or diverters 80 and the tow vessel 12. The dynamically controllable foil system 20 (e.g., one example of a steering element) may be provided on or in place of one or more streamer tag lines or depth ropes 76, extending from the head buoys 75 down to the forward end of the streamer cables 73. The steerable foil systems 20 may also be provided between the tail buoys 77 and the aft ends of the streamer cables 73 and in intermediate streamer locations.

The seismic survey vessel 12 is provided with a navigational system 86 (e.g., the steering system 110 in FIG. 1) including one or more foil steering modules configured to communicate with the dynamically steerable foil systems 20 deployed variously in the source array 10 and the streamer array 72, and/or among the other components of the towed seismic array 70. The foil systems 20 can also be utilized, in addition to source steering, to independently steer and laterally position streamers 73 with or without a discrete spreader or separation rope 74. The steerable foil systems 20 can also be provided in lieu of diverters or paravanes 80, for example in the end streamer positions as shown in FIG. 5A, without the need for a separate spur line 78 and wide tow rope 82. Alternatively, the steerable foil systems 20 can be used within or provided in place of one or more diverters or paravanes 80 using a similar spur cable configuration.

More generally, the foil system 20 can be utilized for steering a wide range of submerged cable and float arrangements, suitable not only to seismic source and streamer steering but also for ocean-bottom cable and node deployment, side scan surveys, and sonar applications. The dynamically steerable foil system 20 may also be adapted to more generalized (non-seismic) uses including generic paravane, diverter and hydrofoil systems. Use with the paravane/diverter cable or P-cable and ocean bottom cables are additional options.

Figure 5B:
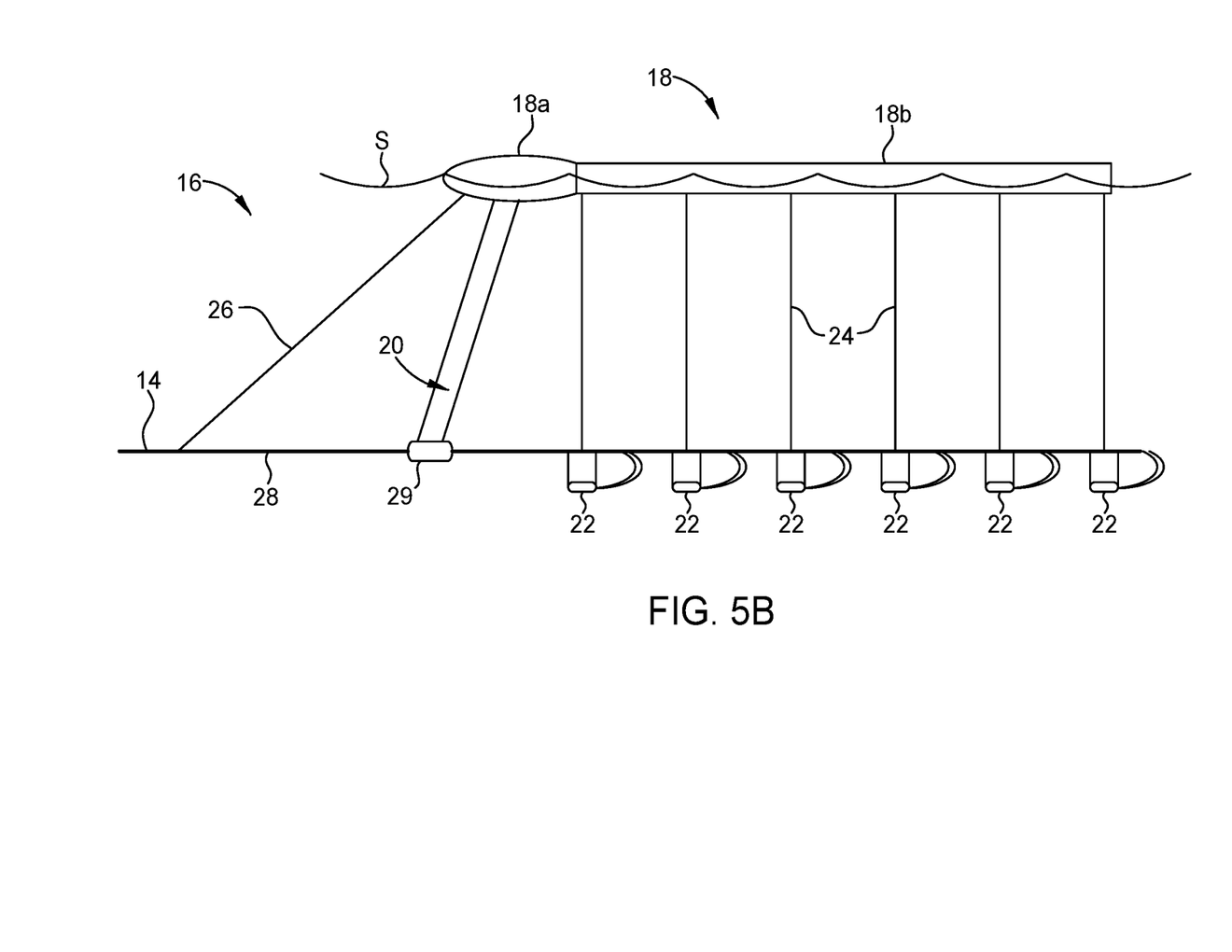
FIG. 5B is a schematic side view of a source array illustrating representative configurations of the foil steering system.

FIG. 5B is a side view of a source array 10 illustrating representative configurations for dynamically controlled foil system 20. In this particular example, a sub-array or string 16 of individual air guns or other seismic sources 22 is suspended from the floatation apparatus 18 via suspension ropes 24, which determine the depth of sources 22 below surface S. Suspension ropes 24 are coupled to selected portions of the float 18, e.g., between head float section 18a and the trailing end of sausage float section 18b.

The float 18 is towed along the surface S via the tow cable 14, which is coupled to the head float section 18 a via a tow leader 26. The tow cable 14 typically comprises an umbilical 28 with data and power connections for seismic sources 22 and is connected to the foil system 20 at a cable connector 29. In air gun applications, the umbilical 28 may include a pneumatic hose or conduit configured to provide pressurized air to the seismic sources 22 in order to generate acoustic shock waves when fired in response to direction by a control system. The shock waves (or other seismic signals) propagate from the seismic sources 22 through the water or other medium, penetrating the ocean floor and reflecting back from subsurface features. The reflected signals are recorded by seismic sensors (e.g., hydrophones or geophones in a streamer cable or ocean-bottom array) and processed to generate geophysical image data representing the subsurface structures.

As shown in FIG. 5B, the dynamically controlled foil system 20 can be coupled between the floatation apparatus 18 and a submerged portion of the tow cable 14, e.g., at the cable connector 29 between the head float 18 a and the umbilical portion 28 of the tow cable 14, aft of the tow leader 26 and forward of the seismic sources 22. Alternatively, the submerged end of the foil system 20 can be coupled to one of the seismic sources 22 (e.g., to the first gun plate in the string).

In these configurations, the foil system 20 is configured to steer the head float 18a by generating hydrodynamic lift forces, which are controlled to achieve the desired lateral positioning of the seismic sources 22 within the source array 10 and with respect to the tow vessel 12—e.g., to keep the sources 22 on a desired path. Alternatively, one or more foil systems 20 can be coupled to the sausage float section 18b and positioned along (or in place of) any of a number of suspension ropes 24 or cables, for example, in a forward position at the lead seismic source 22, in an intermediate position between individual seismic sources 22, or in an aft position at (or trailing behind) the last seismic source 22.

Figure 5C:
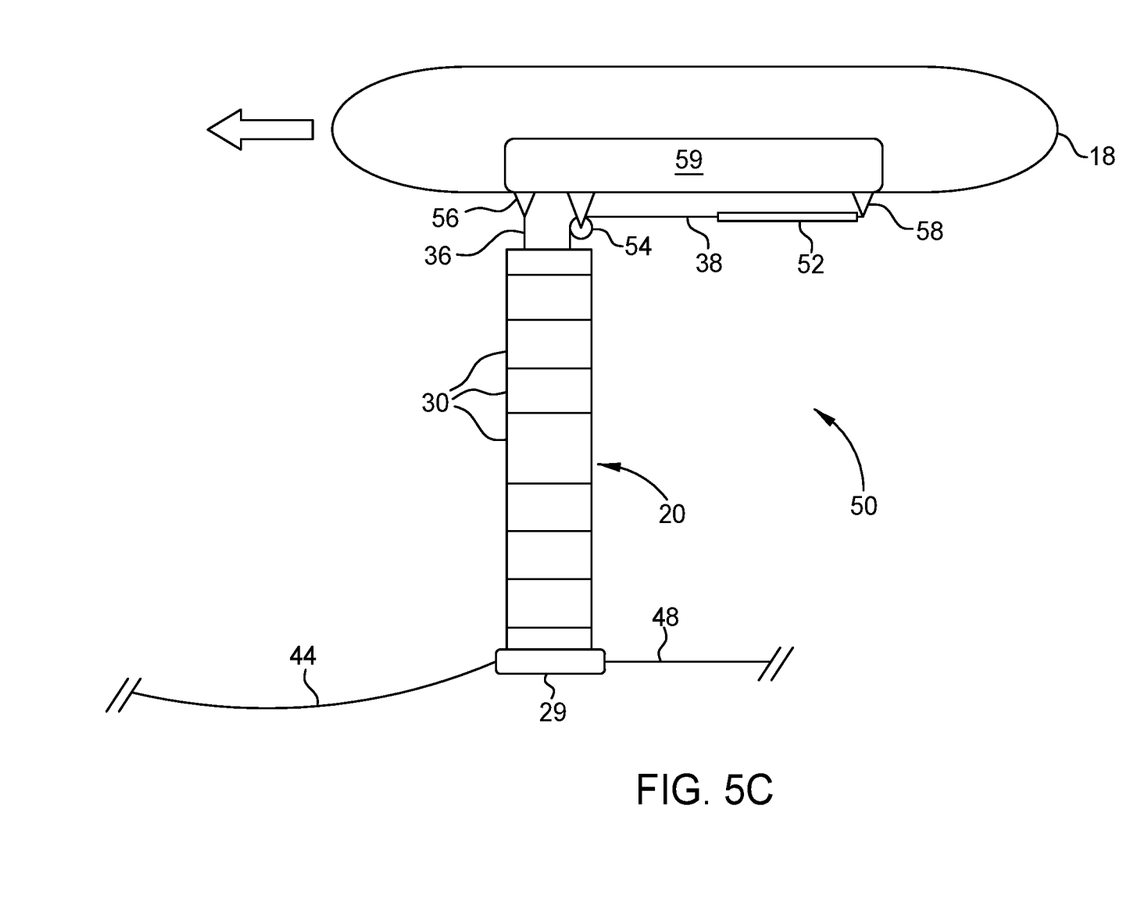
FIG. 5C is a schematic illustration of a cable adjustment mechanism for the foil system.

A schematic illustration of a representative the adjustment mechanism 50 (e.g., a mechanical actuator) for the dynamic foil system 20 is shown in greater detail in FIG. 5C. A turnbuckle 52 and a pulley 54, ratchet, winch, or similar cable guide and feed mechanism may be mounted to the floatation apparatus 18, e.g., between the top end of the aft control cable 38 and an aft anchor point 58 on the back or rear section of the floatation apparatus 18 (in the trailing edge direction of the foil sections 30). The forward cable 36 is mounted to a forward anchor 56 attached to the front section of the floatation apparatus 18 (in the leading edge direction of the foil sections 30).

The adjustment mechanism 50 can be configured for adjusting either the forward cable 36 or the aft cable 38; both embodiments are encompassed. Another option is to use an adjustment mechanism 50 that provides differential adjustments to both forward and aft cabled 36, 38; e.g., by shortening one cable while lengthening the other at the same time. In some designs a single control cable may be used, extending from the forward cable anchor 56 down along a forward cable section 36, then passing through a cable return or wrapping or inflecting around a cable connector 29 attached to a submerged cable 44, and back up along an aft cable section 38 to the aft anchor 58 through the pulley 54. Alternatively, separate forward and aft control cables 36, 38 may be provided, e.g., individually attached at the submerged cable connector 29. The submerged cable 44 can be provided either as a tow line for a streamer cable 48 or as an umbilical for a source gun array.

A control device 59 for the adjustment mechanism 50 may be located at either the top or bottom end of the foil system 20, for example, inside the floatation apparatus 18. Suitable control devices 59 include processor, memory, and software components configured to direct the adjustment mechanism 50 to selectively vary the length and/or tension in the forward and aft cables 36, 38, in order to regulate the lift and steering forces generated by the foil system 20 by changing the angle of attack along individual foil sections For example, the control device 59 may be configured to control an electric motor or similar drive in order to actuate the adjustment mechanism 50, providing for automated steering by adjustment of the relative length and tension in the forward and aft control cables 36, 38. Other control options include, but are not limited to, hydraulic and pneumatically controlled ram or piston mechanisms, electric winch drives, and motor-driven rack and pinion arrangements.

In the context of a seismic survey as described above, a number of seismic energy source devices and/or a number of sensor nodes may be attached along the length of cables deployed and towed behind the marine vessel. Each of the cables, or the seismic equipment attached to the cables, may have a steering device associated therewith in order to adjust the position of the cable or seismic devices within the water. In some implementations, it may be very important that the towed marine equipment such as the cables with seismic equipment closely follow a predetermined course (e.g., in order to accurately map a subsurface formation). In addition, if multiple cables are deployed behind a marine vessel it may be important to maintain a constant separation distance between the cables. To meet these needs, steering elements may be attached to each cable and further or alternatively attached to the equipment towed by the cable.

The foil systems 20 are just one exemplary implementation of a steering element that may be employed to steer and position cables, seismic energy sources, sensor nodes, buoys and floats in the seismic array, etc. Other steering elements for attachment to such sensor array components exist. These may include paravanes, hydrofoils, rudders, wings, elevators, and various other devices. The orientations of each of these devices while being towed through the water may be adjusted for steering. Such adjustments may be made by increasing or decreasing tension on control cables (i.e., making them more taut or more slack), engaging actuators to physically move a steering element; engaging motors to drive rotating elements, etc. In each case, the steering elements are controlled by signals calculated to alter their orientation appropriately to maintain a proper course for the seismic array elements within the water. These signals are determined by sophisticated navigation and control systems that work in concert with the navigation of the marine vessel in order to ensure that the elements of the seismic array stay on course and maintain proper separation distances between adjacent elements.

Figure 6:
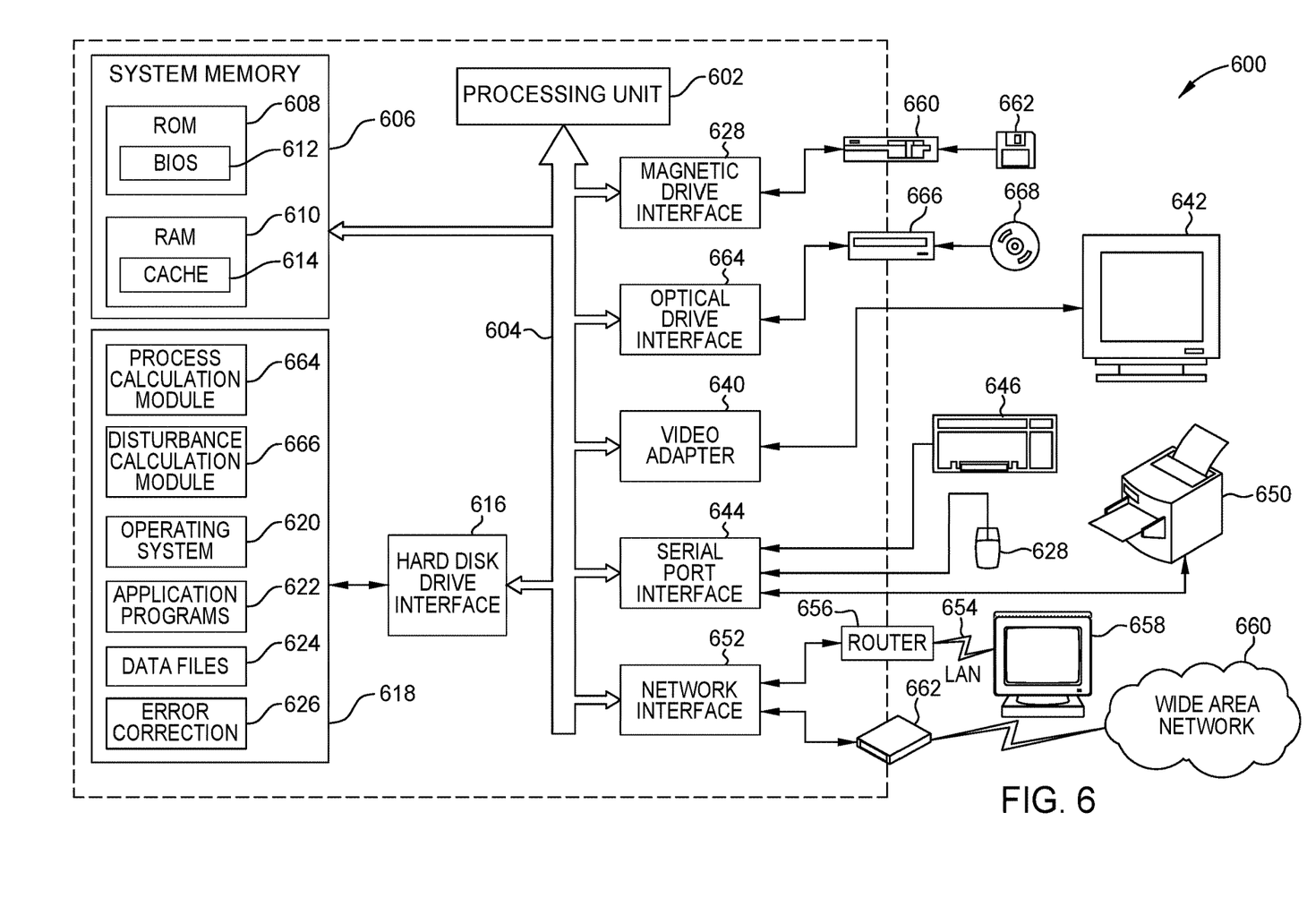
FIG. 6 is a schematic illustration of an exemplary computer system configuration for implementing the process functions of and calculations performed by the control system.

An exemplary computer system 600 for implementing the processes performed by the steering system 110 described above is depicted in FIG. 6. The computer system 600 may be a personal computer (PC), a workstation, a server, a mainframe computer, a distributed computer a portable notebook or tablet computer, or functionally distributed across a number of computers and pieces of specialized control equipment, each with internal processing and memory components as well as interface components for connection with external input, output, storage, network, and other types of peripheral devices. The computer system 600 of FIG. 6 is intended to be a generic representation of computers and control equipment that may include some or all of the components depicted and described. Internal components of the computer system in FIG. 6 are shown within the dashed line and external components are shown outside of the dashed line. Components that may be internal or external are shown straddling the dashed line.

In any embodiment or component of the control system described herein, the computer system 600 includes a processor 602 and a system memory 606 connected by a system bus 604 that also operatively couples various system components. There may be one or more processors 602, e.g., a single central processing unit (CPU), or a plurality of processing units, commonly referred to as a parallel processing environment (for example, a dual-core, quad-core, or other multi-core processing device). The system bus 604 may be any of several types of bus structures including a memory bus or memory controller, a peripheral bus, a switched-fabric, point-to-point connection, and a local bus using any of a variety of bus architectures. The system memory 606 includes read only memory (ROM) 608 and random access memory (RAM) 610. A basic input/output system (BIOS) 612, containing the basic routines that help to transfer information between elements within the computer system 600, such as during start-up, is stored in ROM 608. A cache 614 may be set aside in RAM 610 to provide a high speed memory store for frequently accessed data.

A hard disk drive interface 616 may be connected with the system bus 604 to provide read and write access to a data storage device, e.g., a hard disk drive 618, for nonvolatile storage of applications, files, and data. A number of program modules and other data may be stored on the hard disk 618, including an operating system 620, one or more application programs 622, and data files 624 (for example, the setpoint values and the process values). In an exemplary implementation, the hard disk drive 618 may store the process calculation module 664, the disturbance calculation module 666, and any number of error correction calculators 626. Note that the hard disk drive 618 may be either an internal component or an external component of the computer system 600 as indicated by the hard disk drive 618 straddling the dashed line in FIG. 6. In some configurations, there may be both an internal and an external hard disk drive 618.

The computer system 600 may further include a magnetic disk drive 630 for reading from or writing to a removable magnetic disk 632, tape, or other magnetic media. The magnetic disk drive 630 may be connected with the system bus 604 via a magnetic drive interface 628 to provide read and write access to the magnetic disk drive 630 initiated by other components or applications within the computer system 600. The magnetic disk drive 630 and the associated computer-readable storage media may be used to provide nonvolatile storage of computer-readable instructions, data structures, program modules, and other data for the computer system 600.

The computer system 600 may additionally include an optical disk drive 636 for reading from or writing to a removable optical disk 638 such as a CD ROM or other optical media. The optical disk drive 636 may be connected with the system bus 604 via an optical drive interface 634 to provide read and write access to the optical disk drive 636 initiated by other components or applications within the computer system 600. The optical disk drive 630 and the associated computer-readable optical media may be used to provide nonvolatile storage of computer-readable instructions, data structures, program modules, and other data for the computer system 600.

A display device 642, e.g., a monitor, a television, or a projector, or other type of presentation device may also be connected to the system bus 604 via an interface, such as a video adapter 640 or video card. Similarly, audio devices, for example, external speakers or a microphone (not shown), may be connected to the system bus 604 through an audio card or other audio interface (not shown).

In addition to the monitor 642, the computer system 600 may include other peripheral input and output devices, which are often connected to the processor 602 and memory 606 through the serial port interface 644 that is coupled to the system bus 606. Input and output devices may also or alternately be connected with the system bus 604 by other interfaces, for example, a universal serial bus (USB), an IEEE 1394 interface ("Firewire"), a parallel port, or any number of input/output hardware configurations and protocols. A user may enter commands and information into the computer system 600 through various input devices including, for example, a keyboard 646 and pointing device 648, for example, a computer mouse. Other input devices (not shown) may include, for example, a joystick, a game pad, a tablet, a touch screen device, a satellite dish, a scanner, antennae, GPS devices, a facsimile machine, a microphone, a digital camera, and a digital video camera.

Other output devices may include a printer 650 and one or more loudspeakers 670 for presenting the audio performance of the sender. Further output devices (not shown) may include, for example, a plotter, a photocopier, a photo printer, a facsimile machine, and a press. In some implementations, several of these input and output devices may be combined into single devices, for example, a printer, scanner, fax, or photocopier. It should also be appreciated that other types of computer-readable media and associated drives for storing data, for example, magnetic cassettes or flash memory drives, may be accessed by the computer system 600 via the serial port interface 644 (e.g., USB) or similar port interface.

The computer system 600 may operate in a networked environment using logical connections through a network interface 652 coupled with the system bus 604 to communicate with one or more remote devices. The logical connections depicted in FIG. 6 include a local-area network (LAN) 654 and a wide-area network (WAN) 660. These logical connections may be achieved by a communication device coupled to or integral with the computer system 600. As depicted in FIG. 6, the LAN 654 may use a router 656 or hub, either wired or wireless, internal or external, to connect with remote devices, e.g., a remote computer 658, similarly connected on the LAN 654. The remote computer 658 may be another personal computer, a server, a client, a peer device, or other common network node, and typically includes many or all of the elements described above relative to the computer system 600. In the context of the seismic survey equipment, each of the sensor nodes may be configured to wirelessly connect with the LAN 654 upon retrieval from deployment to download collected data for storage and processing.

To connect with a WAN 660, the computer system 600 typically includes a modem 662 for establishing communications over the WAN 660. Typically the WAN 660 may be the Internet. However, in some instances the WAN 660 may be a large private network spread among multiple locations, or a virtual private network (VPN). The modem 662 may be a telephone modem, a high speed modem (e.g., a digital subscriber line (DSL) modem), a cable modem, a satellite modem, or similar type of communications device. The modem 662, which may be internal or external, is connected to the system bus 604 via the network interface 652. In alternate embodiments the modem 662 may be connected via the serial port interface 644. It should be appreciated that the network connections shown are exemplary and other means of and communications devices for establishing a network communications link between the computer system and other devices or networks may be used.

The technology described herein may be implemented as logical operations and/or modules in one or more systems. The logical operations may be implemented as a sequence of processor-implemented steps executing in one or more computer systems and as interconnected machine or circuit modules within one or more computer systems.

Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the structures disclosed herein, and do not create limitations, particularly as to the position, orientation, or use of such structures. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method for controlling a marine device towed by a marine vessel, comprising:
    identifying an error between a location of the towed device being towed by the vessel and a desired path for the towed device;
    identifying the maximum physical control limit and minimum physical control limit for a steering element, the maximum physical control limit and minimum physical control limit representing a physical control range for the steering element, wherein the steering element controls the location of the towed device using a control setting selected between the maximum physical control limit and the minimum physical control limit, wherein the steering element is at least partially inoperable at one of the maximum or minimum physical control limit;
    determining a course correction for the vessel to reduce the error and maintain the steering element within the physical control range;
    identifying a practical control range for the steering element by setting the control setting to a physical control limit of the physical control range; altering the control setting by a predefined amount from the physical control limit, determining whether the location of the steering element changes in an expected manner due to altered control setting; and repeating the step of altering until the location of the towed device changes in an expected manner, wherein the practical control range is a subset of the physical control range, the steering element being fully operable within the practical control range;
    controlling the vessel using the course correction; and
    operating the steering element at a control setting that is within the practical control range.

2. The method of claim 1, further comprising:
    selecting the course correction which results in an optimized value of the control setting for the steering element, wherein the optimized value is within the practical control range.

3. The method of claim 2, wherein the optimized value is an initial or default value of the control setting within the practical control range of the steering element.

4. The method of claim 3, wherein the initial or default value is a middle of the practical control range of the control setting.

5. The method of claim 2, wherein the optimized value of the control setting enables at least one of the following: minimizes drag on the vessel, improves fuel efficiency of the vessel, or limits the need for a course corrections for the vessel.

6. A method for controlling a marine device towed by a marine vessel, comprising:
    identifying an error between a location of the towed device being towed by the vessel and a desired path for the towed device;
    identifying a physical control range for a steering element controlling the location of the towed device, wherein the steering element is at least partially inoperable outside of the physical control range;
    determining a course correction for the vessel to reduce the error and maintain the steering element within the physical control range;
    determining a control setting for the steering element to reduce the error, wherein the control setting is within the physical control range; and
    controlling the vessel using the course correction and the steering element using the control setting;
    identifying a practical control range for the steering element, wherein the practical control range is a subset of the physical control range, the steering element being fully operable within the practical control range, wherein identifying a practical control range comprises:
    setting the control setting to a first value at a first end of a physical control range;
    sweeping the control setting towards a second end of the physical control range until identifying a first control value where the steering element changes the location of the towed device in an expected manner, wherein the first control value is a first end of the practical control range; and
    sweeping the control setting from the first value towards a second end of the physical control range until identifying a second control value where the steering element can no longer control the location of the towed device, wherein the second control value is a second end of the practical control range;
    wherein the practical control range encompasses the control setting for the steering element, and wherein exceeding the practical control limit by the control setting results in the steering element becoming at least partially uncontrollable.

7. A non-transitory computer-readable storage medium storing instructions, which when executed on a processor, perform an operation, the operation comprising:
    identifying an error between a location of a towed device being towed by a vessel and a desired path for the towed device;
    identifying a physical control range for a steering element controlling the location of the towed device, wherein the steering element is at least partially inoperable outside of the physical control range;
    determining a course correction for the vessel to reduce the error and maintain a control
    setting for the steering element within the physical control range;
    determining an adjustment to the control setting for the steering element to reduce the error, wherein the adjustment is within the physical control range; and
    controlling the vessel using the course correction and the steering element using the adjustment;
    wherein determining an adjustment to the control setting comprises:

identifying a practical control range for the steering element, wherein the practical control range is a subset of the physical control range, the steering element being fully operable within the practical control range;

setting the control setting to a first value at a first end of a physical control range;

sweeping the control setting towards a second end of the physical control range until identifying a first control value where the steering element changes the location of the towed device in an expected manner, wherein the first control value is a first end of the practical control range; and sweeping the control setting from the first value towards a second end of the physical control range until identifying a second control value where the steering element can no longer control the location of the towed device, wherein the second control value is a second end of the practical control range, wherein the practical control range encompasses the control setting for the steering element, and wherein exceeding the practical control limit by the control setting results in the steering element becoming at least partially uncontrollable.

8. The non-transitory computer-readable storage medium of claim 7, wherein the operation further comprises:

selecting the course correction which results in an optimized value of the control setting for the steering element, wherein the optimized value is within the practical control range.

9. The non-transitory computer-readable storage medium of claim 8, wherein the optimized value is an initial or default value of the control setting within the practical control range of the steering element.

10. The non-transitory computer-readable storage medium of claim 9, wherein the initial or default value is a middle of the practical control range of the control setting.

11. The non-transitory computer-readable storage medium of claim 7, wherein the physical control range encompasses a control setting for the steering element, wherein the adjustment modifies the control setting.

12. A system for controlling a marine device towed by a marine vessel, comprising:

a processor; and memory configured to store a program which, when executed by the processor performs an operation, the operation comprising:

identifying an error between a location of a towed device being towed by a vessel and a desired path for the towed device;

identifying the maximum physical control limit and minimum physical control limit for a steering element, the maximum physical control limit and minimum physical control limit representing a physical control range for the steering element, wherein the steering element controls the location of the towed device using a control setting selected between the maximum physical control limit and the minimum physical control limit, wherein the steering element is at least partially inoperable at one of the maximum or minimum physical control limit;

determining a course correction for the vessel to reduce the error and maintain the steering element within the physical control range;

identifying a practical control range for the steering element by setting the control setting to a physical control limit of the physical control range; altering the control setting by a predefined amount from the physical control limit, determining whether the location of the steering element changes in an expected manner due to altered control setting; and repeating the step of altering until the location of the towed device changes in an expected manner, wherein the practical control range is a subset of the physical control range, the steering element being fully operable within the practical control range;

controlling the vessel using the course correction; and operating the steering element at a control setting that is within the practical control range.

13. The system of claim 12, further comprising:

selecting the course correction which results in an optimized value of the control setting for the steering element, wherein the optimized value is within the practical control range.

14. The system of claim 13, wherein the optimized value is an initial or default value of a control setting within the practical control range of the steering element, and wherein the initial or default value is a middle of the practical control range of the control setting.

15. The system of claim 12, wherein the physical control range encompasses a control setting for the steering element, wherein the adjustment modifies the control setting.

16. The system of claim 12, wherein identifying a practical control range further comprises:

setting the control setting to a first value at a first end of a physical control range;

sweeping the control setting towards a second end of the physical control range until identifying a first control value where the steering element changes the location of the towed device in an expected manner, wherein the first control value is a first end of the practical control range; and sweeping the control setting from the first value towards a second end of the physical control range until identifying a second control value where the steering element can no longer control the location of the towed device, wherein the second control value is a second end of the practical control range.

17. A method for controlling a marine device being towed by a marine vessel, comprising:

identifying a maximum physical limit and minimum physical limit for the control setting of a steering element of the towed marine device, wherein the maximum physical limit and minimum physical limit define a physical control range;

identifying a practical control range for the control setting of the steering element by moving the steering element over its physical control range and determining an upper practical limit and lower practical limit for the control setting, outside of which the steering element becomes uncontrollable, wherein the practical control range is a subset of the physical control range;

identifying an error between a location of the towed device being towed by the vessel and a desired path for the towed device;

determining a course correction for the vessel to reduce the error;

controlling the vessel using the course correction to reduce the error, and operating the steering element at a control setting within the practical range to reduce the error.

* * * * *